Patented Sept. 29, 1931

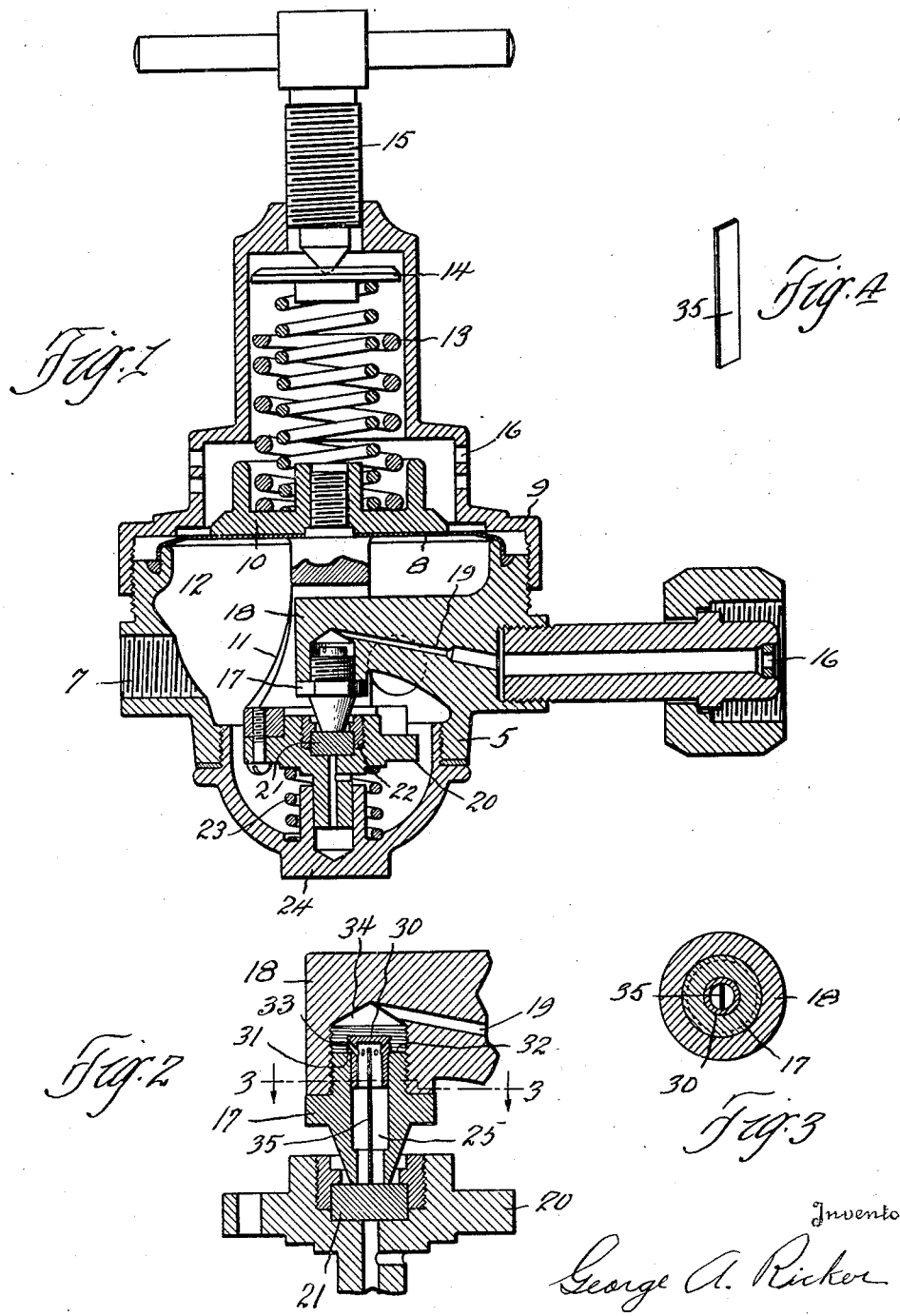

1,825,637

UNITED STATES PATENT OFFICE

GEORGE A. RICKER, OF CORAOPOLIS, PENNSYLVANIA, ASSIGNOR TO CARBO-OXYGEN COMPANY, OF PITTSBURGH, PENNSYLVANIA, A CORPORATION OF DELAWARE

PRESSURE REGULATING VALVE

Application filed November 17, 1930. Serial No. 496,050.

This invention relates to improvements in fluid pressure regulating valves which are used for various purposes including the regulation and delivery of gases, particularly oxygen, to oxy-acetylene welding and cutting apparatus and analogous devices at desired reduction of pressure whereby such gas may be stored in strong tanks at high pressure and delivered at a considerably lower pressure for use.

Pressure regulating valves are employed very largely for reducing a high pressure of gas in a storage tank to a low pressure for different purposes and in their construction it has been customary to employ a relatively movable nozzle and disk, the latter being made of hard rubber or other suitable substance and forming a seat to close the nozzle. Under some conditions of use the nozzle of the regulating valve is opened and closed frequently and high tension means are necessary to overcome the high pressure of the gas supply.

It has been found in practice that the valve disk or seat sometimes takes fire and not only results in destruction of the disk or seat but in more or less damage to the other parts of the regulating valve. Where the gas is oxygen under high pressure, combustion is supported thereby to such an extent that in some cases the nozzle and other parts of the regulating valve have been partly melted, the diaphragm has been destroyed and flame has issued through the openings in the bonnet.

The object of this invention is to protect the valve disk or seat of a fluid pressure regulating valve from combustion or deterioration by reason of heat generated by the gas pressure therein. I am aware that prior to my invention attempts have been made to solve this problem and have resulted more or less successfully. Accordingly, I do not claim broadly a means for preventing combustion or deterioration of the valve disk and associated parts, but I do claim an improved means for accomplishing this result.

I have illustrated my invention in an improved type of high pressure regulating valve and for more detailed description thereof I refer to the accompanying drawings, in which Fig. 1 is a vertical sectional view taken through a regulator valve embodying my invention; Fig. 2 is a detailed sectional view drawn to an enlarged scale and showing a portion of the structure shown in Fig. 1; Fig. 3 is a detailed section taken on line 3—3 of Fig. 2; and Fig. 4 is a detail of a small metallic strip which I optionally employ in connection with the nozzle through which gas passes from the tank into the regulator valve.

Referring to the drawings, the valve casing comprises a body 5 provided with a gas inlet 6 adapted to be connected with the gas supply tank, and an outlet 7 through which the gas is delivered to the work. Pressure gauges are customarily connected to the inlet and the outlet of the regulating valve or to the gas connections thereto. A diaphragm 8 is arranged between the body 5 and the bonnet 9 of the valve casing and is secured in place by the collar 10 which threadedly engages the stem of a yoke 11 within the diaphragm chamber 12. One or more springs 13 are arranged within the bonnet between the collar 10 and a button 14, and an adjusting screw 15 threaded in the end of the bonnet engages the button to vary the tension of the spring. The bonnet is preferably provided with openings 16 to permit instant escape of pressure without damage to the regulating valve in the event the diaphragm is broken. An inlet nozzle 17 is secured in a bridge 18 and is connected by a passage 19 with the gas inlet 6. The yoke 11 straddles the bridge and nozzle and carries a support 20 having a valve disk 21 seated therein and secured by a valve ring 22. The valve disk is arranged to engage the discharge end of the nozzle for shutting off the passage of gas from the supply through the nozzle to the chamber 12 and thence through the outlet 7 to the work. A balance spring 23 is interposed between the support 20 and a cap 24 on the valve body 5 and tends to hold the valve disk 21 against the discharge end of the nozzle.

Thus far I have described a type of high pressure regulating valve with which my present invention may be easily embodied with most satisfactory results and it will be understood that I have selected this type of regulating valve for the purpose of illustrating my invention and because it is a successful commercial type, but I do not wish to be understood as restricting the invention to this or any other special type or construction of regulating valve.

In this type of regulating valve the valve disk is moved to and from the discharge end of the nozzle and forms a seat for closing the nozzle as required. When the disk is seated against the discharge end of the nozzle to shut off the flow of gas through the nozzle, high pressure accumulates in the passage 25, and at the discharge end of the nozzle. It has been found in practice that where no means is provided to avoid such action, a very high temperature is produced at the point of contact of the nozzle 17 with the valve disk 21. This often results in damage to the valve seat and associated parts.

I have found that by the use of the small cup-shaped member 30 constructed as illustrated, the high temperature and consequent danger or damage to the valve seat and other parts of the valve are prevented. The member 30 consists essentially of a cup-shaped member having the lower end restricted to provide a shoulder 31 adapted to engage against the upper surface 32 of the nozzle 17 and provided with outwardly extending angular passages 33 connecting the interior of such cup-shaped member with the space 34 which communicates through the bore 19 with the connection 6. It will be seen that gas entering through the space 34 must enter from outside the cup-shaped member at a point below the top thereof and that it will be directed toward the center of the passage 25. The reason why this structure is effective is not thoroughly understood, but it has been tried in practice and found to be very effective.

In the drawings I have shown a thin metallic strip 35 which may be placed in the passage 25 and held in more or less fixed position by the walls of such passage and those of the cup-shaped member 30 and held against longitudinal displacement by the end wall of the member 30 and the valve seat 21. This strip gives a somewhat improved performance, but very satisfactory results may be had without its use.

From the foregoing it will be evident that I have provided an improved safety construction in a device of the character described, and while I have illustrated the preferred embodiment of my invention, I wish it understood that changes in details of construction may be made without departing from the spirit of my invention and within the scope of the appended claims.

Having thus described my invention, what I claim is:

1. A fluid pressure regulating valve comprising a nozzle and heat vulnerable valve disk or seat therefor, one of said parts being movable relatively to the other part, and a cup-like member arranged within the nozzle to prevent the creation by the fluid pressure within the nozzle of such heat as will cause melting or combustion of the disk or seat, said cup-like member having its open end extending into the upper end of the nozzle and being provided with a series of passages extending from the interior thereof upwardly and outwardly and opening above the upper end of said nozzle.

2. A fluid pressure regulating valve comprising a nozzle and heat vulnerable valve disk or seat therefor, one of said parts being movable relatively to the other part, and a cup-like member arranged within the nozzle to prevent the creation by the fluid pressure within the nozzle of such heat as will cause melting or combustion of the disk or seat, said cup-like member having its open end extending into the upper end of the nozzle and being provided with a series of passages extending from the interior thereof upwardly and outwardly and opening above the upper end of said nozzle, said passages being disposed around and opening through the convex wall of said cup-like member.

3. A fluid pressure regulating valve comprising a nozzle and a heat vulnerable valve disk or seat therefor, one of said parts being movable relatively to the other part, and a cup-like member arranged within the nozzle to prevent the creation by the fluid pressure within the nozzle of such heat as will cause melting or combustion of the disk or seat, said cup-like member having its open end restricted and extending into the upper end of the nozzle and being provided with a series of passages extending from the interior thereof upwardly and outwardly and opening above the upper end of said nozzle.

4. A fluid pressure regulating valve comprising a nozzle and a heat vulnerable valve disk or seat therefor, one of said parts being movable relatively to the other part, and a cup-like member arranged within the nozzle to prevent the creation by the fluid pressure within the nozzle of such heat as will cause melting or combustion of the disk or seat, said cup-like member having its open end extending into the upper end of the nozzle and being provided with a series of passages from the interior to the exterior thereof, said passages opening above the upper end of said nozzle member.

5. A fluid pressure regulating valve comprising a nozzle and a heat vulnerable valve disk or seat therefor, one of said parts being movable relatively to the other part, a cup-like member arranged within the nozzle to prevent the creation by the fluid pressure within the nozzle of such heat as will cause melting or combustion of the disk or seat, said cup-like member having its open end extending into the upper end of the nozzle and being provided with a series of passages from the interior to the exterior thereof, said passages opening above the upper end of said nozzle member, and a strip of metal within said nozzle and held in place by said cup-like member and said valve seat.

6. A fluid pressure regulating valve comprising a nozzle and a heat vulnerable valve disk or seat therefor, one of said parts being movable relatively to the other part, a cup-like member arranged within the nozzle to prevent the creation by the fluid pressure within the nozzle of such heat as will cause melting or combustion of the disk or seat, said cup-like member having its open end extending into the upper end of the nozzle and being provided with a series of passages from the interior to the exterior thereof, said passages opening above the upper end of said nozzle member, and a strip of metal within said nozzle and held in place by said cup-like member and said valve seat, said strip being of a width nearly as great as the internal diameter of said nozzle.

In testimony whereof, I hereunto affix my signature.

GEORGE A. RICKER.